May 29, 1928.
R. L. DAVIS
1,671,467
MODULATION METER
Filed June 23, 1925
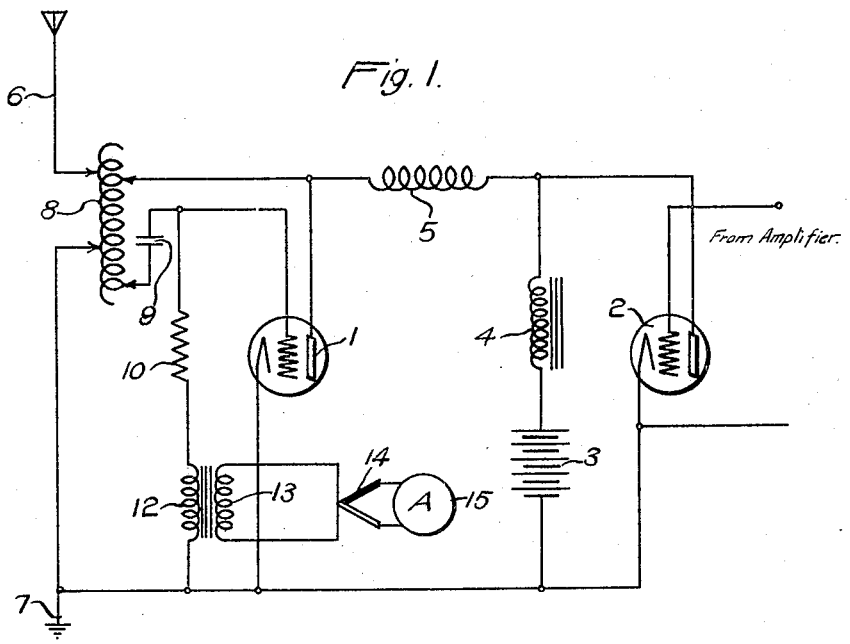
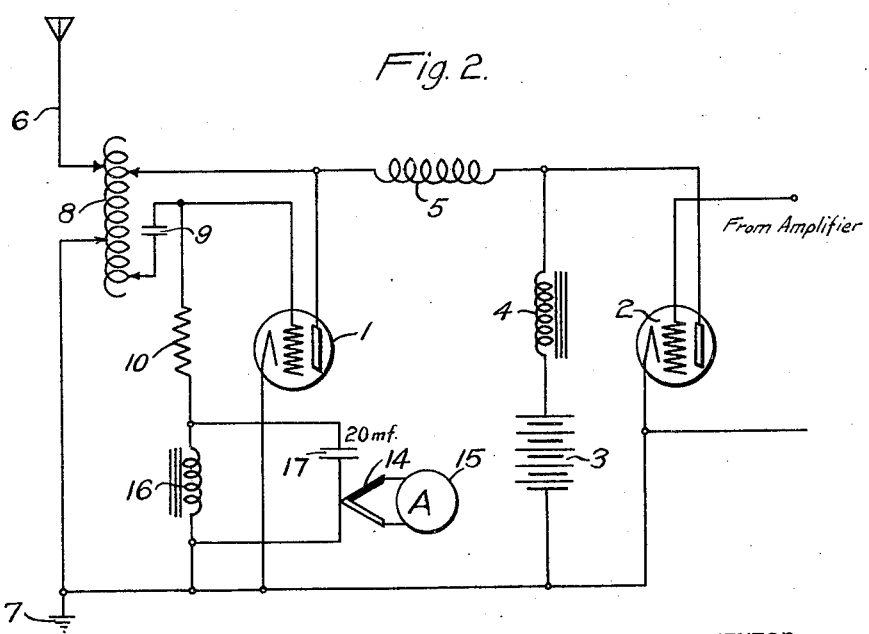
WITNESSES:
INVENTOR
Robert L. Davis.
BY
ATTORNEY Patented May 29, 1928.

1,671,467

UNITED STATES PATENT OFFICE.

ROBERT L. DAVIS, OF WILKINSBURG, PENNSYLVANIA, ASSIGNOR TO WESTINGHOUSE ELECTRIC & MANUFACTURING COMPANY, A CORPORATION OF PENNSYLVANIA.

MODULATION METER.

Application filed June 23, 1925. Serial No. 39,051.

This invention relates to radio sending systems and particularly to means for measuring the modulation in such systems.

In a well-known modulation system, two vacuum tubes are supplied in parallel from one source of current. The power used by one of these vacuum tubes is controlled by the signal. The other vacuum tube, which acts as a generator of oscillations, has supplied to it the difference between the power used in the modulator and the total power delivered by the source.

It has been proposed to measure the modulation by measuring the variations in current delivered to the oscillator from the common source. This method of measurement has the disadvantage that the measuring instrument or the transformer used to couple to the measuring instrument constant, is subjected to high potential and heavy current and is, therefore, expensive and a source of some danger.

It is an object of my invention to provide means for measuring the modulation in a modulation system of the type described which shall not require expensive apparatus and which, because it is not subject to high potential, shall be free from the dangers associated with the measuring methods used heretofore.

It is a further object of my invention to locate the connections delivering energy to the modulation meter in the grid leak connection between the resistor and the ground connection.

It is a further object of my invention to measure the modulation by means of the variations in the grid current which accompany changes in the power in the oscillator.

It is a further object of my invention to provide a modulation meter of inexpensive construction and so located in the system that it shall not be subjected either to high potentials or to heavy currents.

Other objects of the invention and details of the construction will be apparent from the following description and the accompanying drawing in which, Fig. 1 is a circuit diagram illustrating one embodiment of my invention, and Fig. 2 is a similar diagram illustrating a modification.

The modulation system includes the usual vacuum-tube oscillation generator 1 and vacuum tube modulator 2. The grid potential in the modulator is supplied through amplifiers from the usual microphone. These elements are not illustrated since they are of any usual or standard construction.

The source 3 of direct current is caused, by the large inductor 4, to deliver a steady total current. The plate circuit of the modulator 2 and the plate circuit of the oscillator 1 are connected to be supplied in parallel from the source 3. The connection includes the usual radio-frequency choke coil 5 for preventing the oscillations produced by the generator 1 from passing into the modulator. The system also includes the usual antenna 6 and ground connection 7.

The connections which cause the vacuum tube 1 to be an oscillation generator include, in the form chosen for illustration, a coil 8, but it will be evident that any of the familiar system of connections by which a vacuum tube is caused to function as an oscillator, may be used. The connections include, also, a grid condenser 9 and a grid leak comprising a resistor 10. Instead of being connected immediately around the condenser 9, as is usual in some forms of oscillation generators, the grid leak is connected directly between the grid and the ground connection which is also the cathode connection.

The portion of the grid-leak circuit between the resistor 10 and the cathode or ground includes the primary 12 of an audio-frequency transformer. The secondary 13 of this transformer delivers current to a current measuring device. Any form of current measuring device may be used. The most readily available forms will indicate the average value of the square of the current. A preferable arrangement, however, is one which will indicate the variations in the maximum current. The form actually illustrated includes a thermocouple 14 and a direct-current milli-ammeter 15.

In the modification illustrated in Fig. 2, a coil 16 is included between the resistor 10 and the ground connection 7 or the cathode connection. The inductance of this coil is great enough to prevent substantially all audio-frequency current from passing. In parallel with the inductor 16 is a condenser 17 of sufficient capacity to insure ready passage for current of audio-frequency. It has been found that a capacity of 20 microfarads is great enough for this purpose. The thermal couple 14 and the direct-current meter 15 are related to the shunt including the condenser 17 in the same way that, in Fig. 1, they are related to the secondary 13.

In the operation of the device, the source 3 supplies current both to the oscillator 1 and the modulator 2. The potential received from the amplifiers modulates the current supplied to the modulator 2 with the result that the current supplied to the oscillator is also modulated. The power delivered to the oscillator 1 and the power delivered by the oscillator 1 in the form of oscillations both vary in accordance with the modulation. This fact may well be stated by saying that the power in the modulator varies.

When the oscillator is using a large amount of power and delivering oscillations of large amplitude, the negative charge upon the grid becomes large. Consequently the current through the resistor 10 also becomes large. When a small amount only of power is delivered to the oscillator and the amplitude of the oscillations is small, the negative charge upon the grid is also small and the current through the resistor 10 becomes small. It will, therefore, be evident that the changes in the current through the resistor 10 correspond to the changes in the power in the oscillator; that is, they correspond to the modulation.

Since the current through the resistor 10 which is the grid current, traverses the primary winding 12 of the audio-frequency transformer, current will be induced in the secondary winding 13 proportional to the changes of current in the primary 12. The secondary 13, therefore, delivers a current corresponding to the modulation. When the modulation is great, the ammeter 15 will have a high reading. When the modulation is absent, this instrument will receive no current and will, therefore, read zero. Preferably the graduations upon this instrument are made to read from zero to 100, indicating in percent the degree of modulation. At 100% modulation, the amplitude of the oscillations delivered by the tube 1 varies from zero to twice its normal magnitude. The instrument 15 is graduated in percentage and so calibrated that its 100% reading corresponds to 100% modulation and its zero reading to a steady state.

Many variations in the specific structure embodying my invention will readily occur to those skilled in the art. I, therefore, do not intend the illustration and specific description of the two modifications to be construed as a limitation. No limitations, except as required by the prior art or stated in the claims is intended.

I claim as my invention:

1. In a radio sending device, a modulator, a vacuum-tube oscillation generator including a grid leak, and means, including a device in series with said grid leak, for measuring the modulation.

2. In a radio sending device, a modulator, a vacuum-tube oscillation generator including a grid, a cathode, and a grid-leap resistor between said grid and said cathode, and means, including a device between said resistor and cathode, for measuring the modulation.

3. In combination, an oscillation generator, including a grid and a grid-biasing means controlled by grid current, means for modulating the power in said oscillation generator whereby said grid current will be varied, and means responsive to said variations for measuring said oscillation.

4. In a constant current modulation system, a vacuum-tube oscillation generator, a vacuum-tube modulator, a common source of direct-current supplying the plate circuits of the vacuum tubes, means for maintaining the current from said source constant, a grid leak in said vacuum-tube oscillation generator, an inductor on the low-potential side of said grid leak, a condenser of sufficient capacity to readily pass audio-frequency current in shunt with said inductor, and a current-responsive device in series with said condenser whereby said current-responsive device will measure the degree of modulation.

In testimony whereof, I have hereunto subscribed my name this 11th day of June, 1925.

ROBERT L. DAVIS.